US007228400B2

(12) United States Patent
Sheriff et al.

(10) Patent No.: US 7,228,400 B2
(45) Date of Patent: Jun. 5, 2007

(54) CONTROL OF MULTIPLY MAPPED MEMORY LOCATIONS

(75) Inventors: Tayib Sheriff, Cedar Park, TX (US); Moinul H. Khan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 10/750,595

(22) Filed: Dec. 31, 2003

(65) Prior Publication Data

US 2005/0144417 A1    Jun. 30, 2005

(51) Int. Cl.
*G06F 12/00* (2006.01)
(52) U.S. Cl. ........................... 711/203; 713/194
(58) Field of Classification Search ............ 711/203
See application file for complete search history.

(56) References Cited

U.S. PATENT DOCUMENTS

| 5,895,487 A | * | 4/1999 | Boyd et al. ............ 711/122 |
| 6,606,707 B1 | * | 8/2003 | Hirota et al. ............ 713/172 |
| 6,775,750 B2 | * | 8/2004 | Krueger ................. 711/152 |
| 6,854,039 B1 | * | 2/2005 | Strongin et al. ........ 711/163 |
| 2002/0095545 A1 | * | 7/2002 | Dalvi et al. ............ 711/103 |
| 2003/0140244 A1 | * | 7/2003 | Dahan et al. ............ 713/200 |
| 2005/0055524 A1 | * | 3/2005 | Gulick et al. ........... 711/166 |

* cited by examiner

*Primary Examiner*—Brian R. Peugh
*Assistant Examiner*—Hahem Farrokh
(74) *Attorney, Agent, or Firm*—Trop, Pruner & Hu, P.C.

(57) ABSTRACT

A technique to manage multiple-mapped memory and to selectively execute at least a portion of a process from either an unprotected function or a protected function. The process contains memory that is multiple-mapped to both an unprotected memory region and to a protected memory region that stores a protected function. A trust co-processor determines whether the process is a trusted process or an untrusted process. If trusted, the multiple-mapped memory is mapped to the protected memory region; and a transfer agent operates to control the process and to call the protected function using parameters provided to the transfer agent from the process. In one embodiment, the transfer agent resides in nonvolatile memory, and is transferred to internal SRAM to control execution of a trusted process.

24 Claims, 3 Drawing Sheets

CONTROL OF MULTIPLY MAPPED MEMORY LOCATIONS

BACKGROUND

Multiply mapped memory locations arise in situations where two, or more, disparate memory regions are mapped onto the identical physical address space. The disparate memory regions may respectively exist in different memory devices, such as in flash memory or in ROM (read only memory), for example, or may exist in different areas of the same memory device. Multiple mapping (alternatively referred to as "overloading") of physical address space may be used, for example, to effect protected or secure execution of programming code, and may also be used to limit access to sensitive information. However, as heretofore contemplated, multiple mapping (or overloading) of physical address space precludes convenient communication or concurrent accesses between participating (overloaded) memory regions. This shortcoming derives from the fact that, in accordance with the prevailing state of the art, only one of the mapped regions may be active at a given time.

Accordingly, what is desired is a technique for effectively transferring control between multiply mapped memory locations. That is, in a system that utilizes multiple-mapped physical memory address, what is lacking is a mechanism for dynamic overloading, whereby control of a process that is predicated on, or encounters, multiple mapped memory may be effectively alternated between programming code that is resident in, at least, a first (e.g., unprotected) memory region and second (e.g., protected) memory region, where the memory regions are mapped onto identical physical address space.

BRIEF DESCRIPTION OF THE DRAWINGS

The subject technique to control multiply mapped memory locations may be better understood by, and its many features, advantages and capabilities made apparent to, those skilled in the art with reference to the Drawings that are briefly described immediately below and are attached hereto, in the several Figures of which identical reference numerals (if any) refer to identical or similar elements, and wherein.

Figure 1:
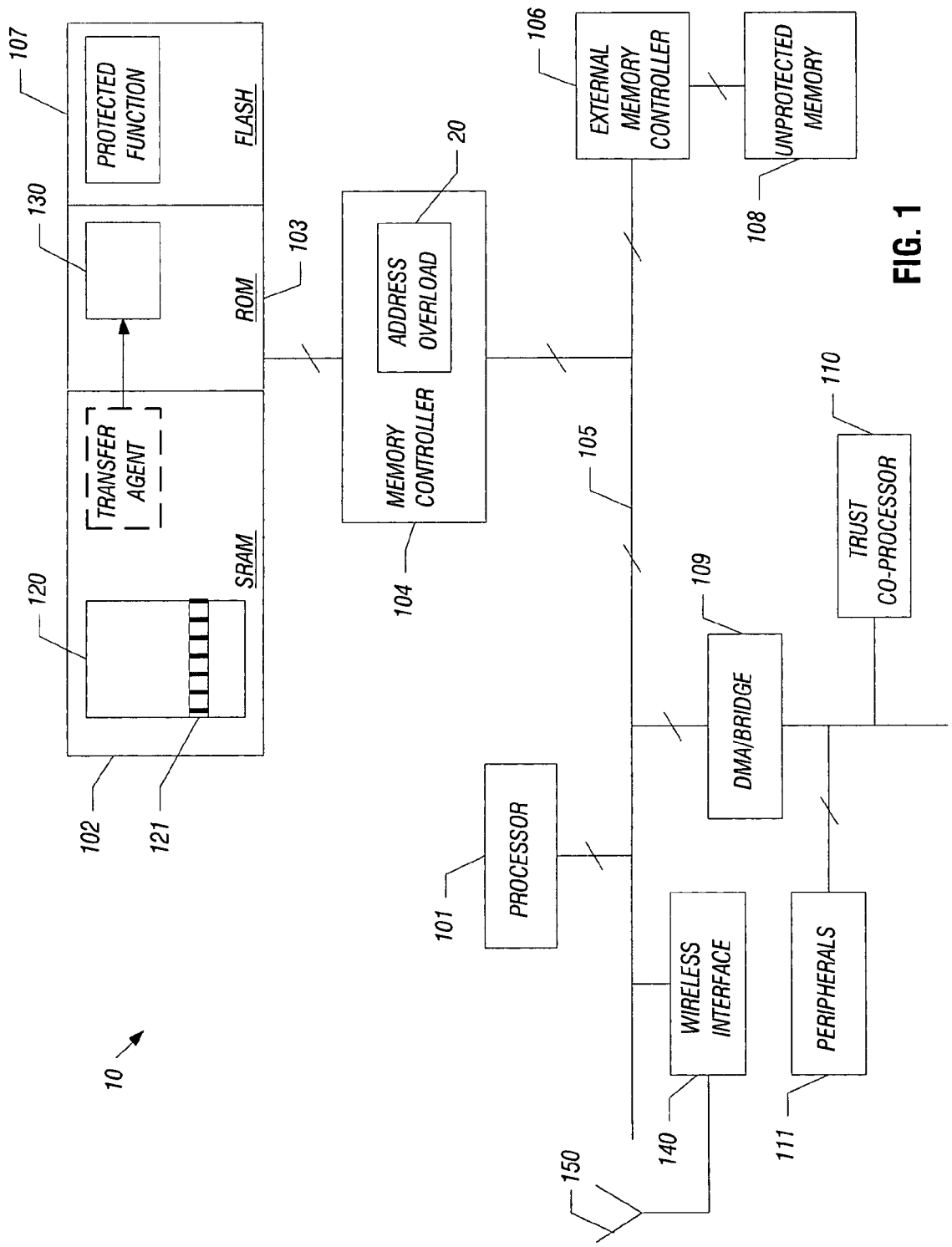
FIG. 1 is a system block diagram of one embodiment of the invention.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

In one embodiment, the subject invention represents a method and apparatus for controlling a process in which there is encountered multiple-mapped memory. For present purposes, multiple-mapped memory may be understood to be memory, i.e. a memory location, or a coherent collection of memory locations (such as might constitute a program), that occupies a physical address space and that is mapped to at least two, or more, memory regions. That is to say, assume that a process (e.g., an application program, an operating system, etc.) is executing under the control of a processor from internal SRAM (static random access memory) that is coupled to the processor. In the course of process execution, memory is encountered that occupies a physical address space in SRAM, which physical address space is mapped to at least two different address spaces (memory regions) that are distinct from the physical address space that is occupied by the process at run time, and that are physically distinct from each other.

For example, the physical address of the process in SRAM may be mapped both to a first memory region in ROM (read only memory), for example, and, alternatively, to a second memory region in flash memory, for example. In this sense, at least, the multiple-mapped memory may be said to be "overloaded." In a manner to be described in detail below, the multiple-mapped memory is selectively mapped to two or more memory regions, depending on the value of a predetermined condition, which condition may be inherent to the process or exogenous to it.

As indicated above, in the preexisting art, multiple mapping, or overloading, of a physical address space fails to facilitate communication or concurrent access between participating (overloaded) memory regions. This shortcoming derives from the fact that, attendant the prevailing state of the art, only one of the mapped regions may be active at a given time. The subject invention redresses this situation in the manner described below.

Referring now to FIG. 1, as depicted therein, in one embodiment of the invention, a system 10 comprises a core processor 101. (For purposes of simplicity, the subject invention will be described here with reference an embodiment in which the multiple mapped memory is double mapped. That is, the same physical address space is mapped to two alternatively selectable address spaces. However, skilled practitioners understand that the invention may be implemented so as to comprehend mapping to more than two selectable address spaces, and is therefore, a technique than enables multiple mapping.)

System 10 may be exploited in any number of devices or equipments, of numerous designs, including, but not limited to, computer equipment (including, for example, workstations, desktops, notebook computers, personal digital assistants (PDAs) and the like), communications equipment, consumer electronics, etc. Internal memory of system 10 may comprise a first memory 102 and a second memory 103. For present purposes, memory 102 and memory 103 may be deemed to be internal in the sense that, for example, memory 102, memory 103 and processor 101 are implemented on the same integrated circuit device. In general, memories 102 and 103 may represent distinct memory types, so that in one embodiment, at least, memory 102 may be a volatile memory type, such as SRAM (semiconductor random access memory), and memory 103 may be a nonvolatile memory type, such as ROM. Internal memory of system 10 may also comprise a third memory 107, about which more will be revealed below. It is sufficient for now to know that in one embodiment of the invention, memory 107 may store a protected function. Memory 102, memory 103, and memory 107 may be coupled through an internal memory controller 104 to bus 105. Bus 105 also couples memories 102, 103, and 107 to processor 101.

In the embodiment of FIG. 1, bus 105 also couples to external memory controller 106, which may, in turn be coupled to external memory 108. Although only one external memory is shown in FIG. 1, the number of external memories to which external memory controller may be coupled is not an aspect of the invention, nor a limitation on its scope. One external memory is illustrated in FIG. 1, principally for purposes of concision and precision in the description of the subject invention.

In the embodiment of FIG. 1, bus 105 also couples through a DMA (direct memory access)/bridge device 109 to a trust co-processor 110 and to representative peripheral device(s) 111. For pedagogical purposes, system 10, as described above and illustrated in FIG. 1, may represent, with some embellishment unrelated to the subject invention, a canonical architecture for a wireless communication appliance, such as a cellular telephone, a wireless Internet client, or the like. Skilled practitioners will recognize that system 10 comprises components, specifically, trust co-processor 110 and address overload circuit 20, not present in the prior art. The significance of those components, in the context of the subject invention, will become apparent from the description below.

Recall here that the leitmotif of the subject invention is the realization of a technique that enables efficient and effective control of multiple-mapped memory so as to alleviate the shortcomings of the preexisting approaches. In one aspect of the invention, multiple-mapped memory may be selectively mapped to a globally visible, unprotected function, as well as to a hidden, protected, function.

In order to appreciate the manner in which selective mapping may be accomplished in one embodiment of the invention, assume that a process (e.g., an application program, an operating system (OS) driver, or an OS daemon) 120 is loaded on memory 102 for execution by processor 101. For present purposes, memory 102 may be characterized as internal memory in at least the sense that memory 102 is implemented on the same integrated circuit device as is processor 101, and may, in a preferred embodiment, be a companion to processor 101 as constituent elements on one monolithic device.

Assume, further, that at some point in the execution of process 120, there is encountered multiple-mapped, or overloaded, memory 121. For purposes of the present invention, overloaded memory 121 may comprises one, to a small number, to a large number of physical memory locations or addresses.

As has been indicated above, memory 121 is "overloaded," in at least in one sense, in that memory 121 is mapped to more than one set of memory. In one embodiment, overloaded memory 121 may be selectively mapped to either internal memory 107 or to external memory 108, depending, for example, on the existence vel non of a predetermined condition. In a preferred embodiment, and for reasons that will be made clear below, memory 107 may also be internal memory. In some embodiments, memory 107 and memory 108 may represent different memory technologies. For example, memory 107 may be flash memory and memory 108 may be ROM. But such is not necessarily the case. Skilled practitioners will appreciate that the nature of the invention is, with the exception of certain salient features to be identified below, largely indifferent to the specific characteristics of memories 107 and 108 and that, in an alternative embodiment, overloaded memory 121 may map to different memory areas in the same physical memory device, whatever the memory type. The particular memory (for example, memory 107 or memory 108) to which overloaded memory 121 is mapped is selectively controlled by address overload circuit 20 (depicted in detail in FIG. 2), in conjunction with trust co-processor 110.

Specifically, in one embodiment of the invention, address overload circuit 20 responds to an input provided by, or derived from, trust co-processor 110 to map memory 121 to either memory 107 or memory 108. For purpose that will become clear presently, memory 107 may be considered "protected" memory, and memory 108 may be considered "unprotected" memory. Unprotected memory 108 is, for all purposes relevant here, considered to be globally visible memory. Conversely, protected memory 107 may be considered to be "hidden" in that memory 107 is not universally accessible and, further, in that memory 107 may store programming code that implements a "protected" function.

As suggested above, the direction in which address overload circuit 20 selectively maps overloaded memory 121 depends on an input received from trust co-processor 110. For example, in one embodiment of the invention, trust co-processor 110 may operate to scan and validate process 120. If process 120 is determined to be a trusted process, then a first signal (T) is provided to address overload circuit 20. If the process is not trusted, a second signal ($\overline{T}$) is provided to circuit 20.

Figure 2:
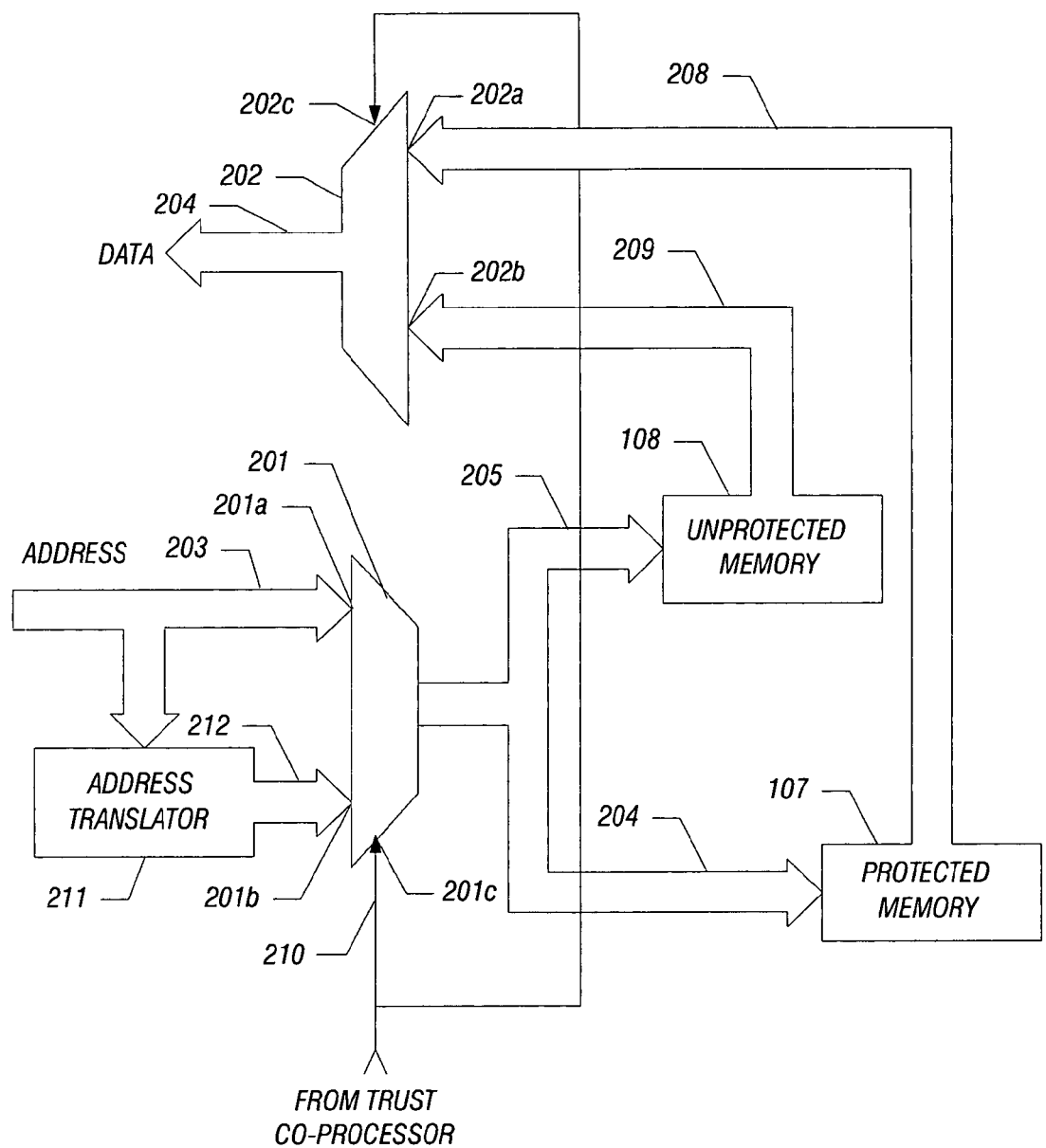
FIG. 2 is a block diagram of an address overload mechanism used in one embodiment of the invention to selectively map memory between protected and unprotected memory.

Referring now to FIG. 2, depicted therein is a detailed block diagram of the address overload circuit 20 that is referred to above. In the embodiment of FIG. 2, address overload circuit 20 is seen to include an address multiplexer 201 and a data multiplexer 202. Address multiplexer 201 is coupled to internal memory controller 104 through address bus 203, and data multiplexer 202 is coupled to internal memory controller 104 through data bus 204. Address multiplexer 201 is coupled to protected (i.e., hidden) memory 107 through a first address path 204 and is coupled to unprotected (i.e., visible) memory 108 though a second address path 205. The output of protected memory 107 is coupled to data multiplexer 202 through a first data path 208; and the output of unprotected memory 108 is coupled to data multiplexer 202 though second data path 209.

As is readily seen in FIG. 2, an address is provided to address overload circuit 20 from internal memory controller 104 on address bus 203. The address on address bus 203 is coupled directly to input 201a of address multiplexer 201 and is coupled through an address translator 211 to input 201b of address multiplexer 201, via a translated address bus 212. A control signal 210 (where 210=T, $\overline{T}$) is coupled to control input 201c of address multiplexer 201 from trust co-processor 110. Control signal 210 from trust co-processor 110 is similarly coupled to control input 202c of data multiplexer 202.

As to operation, in one embodiment of the invention, address overload mechanism 20 generates a pair of distinct addresses from the address that is provided on address bus 203. In one embodiment of the invention, the address data on address bus 203 may be coupled from an address comparator (not shown) that is included in, or operates in conjunction with, memory controller 104. One of the addresses at the output of address multiplexer 201 is mapped to unprotected memory 108, and is coupled to unprotected memory 108 via address path 205. By virtue of the operation of address translator 211, a second address is mapped to protected memory 107, and is coupled to memory 107 via address path 204. The respective outputs of memory 107 and memory 108 are coupled to data multiplexer 202 at inputs 202a and 202b, respectively. In this manner, signal 210, provided by trust co-processor 110, may be used to selectively determine which address space, 108 or 107, is accessed. That is, if signal 210=T, then protected memory 107 is accessed; if signal 210=T̄, then unprotected memory 108 is accessed.

As indicated above, the value of signal 210 (T, T̄) is determined by trust co-processor 110. In general, trust co-processor operates so that if the predetermined condition is determined to exist, then trust co-processor will provide a signal 210=T; if not, signal 210=T̄.

In this regard, it should be noted that the scope of the subject invention is not constrained by or limited with regard to the range of conditions that may be considered by trust co-processor 110. However, in one significant application of the invention, trust co-processor may operate to determine whether the then-executing process 120 is a trusted process. In this context, process 120 may be considered to be a trusted process if it has been obtained from a trusted source. For example, if process 170 is an application program or an OS, then it may contain a signature (likely coded and/or encrypted) that verifies its source. In one embodiment of the invention, the process may be validated at the time the system or the process is booted.

Figure 3:
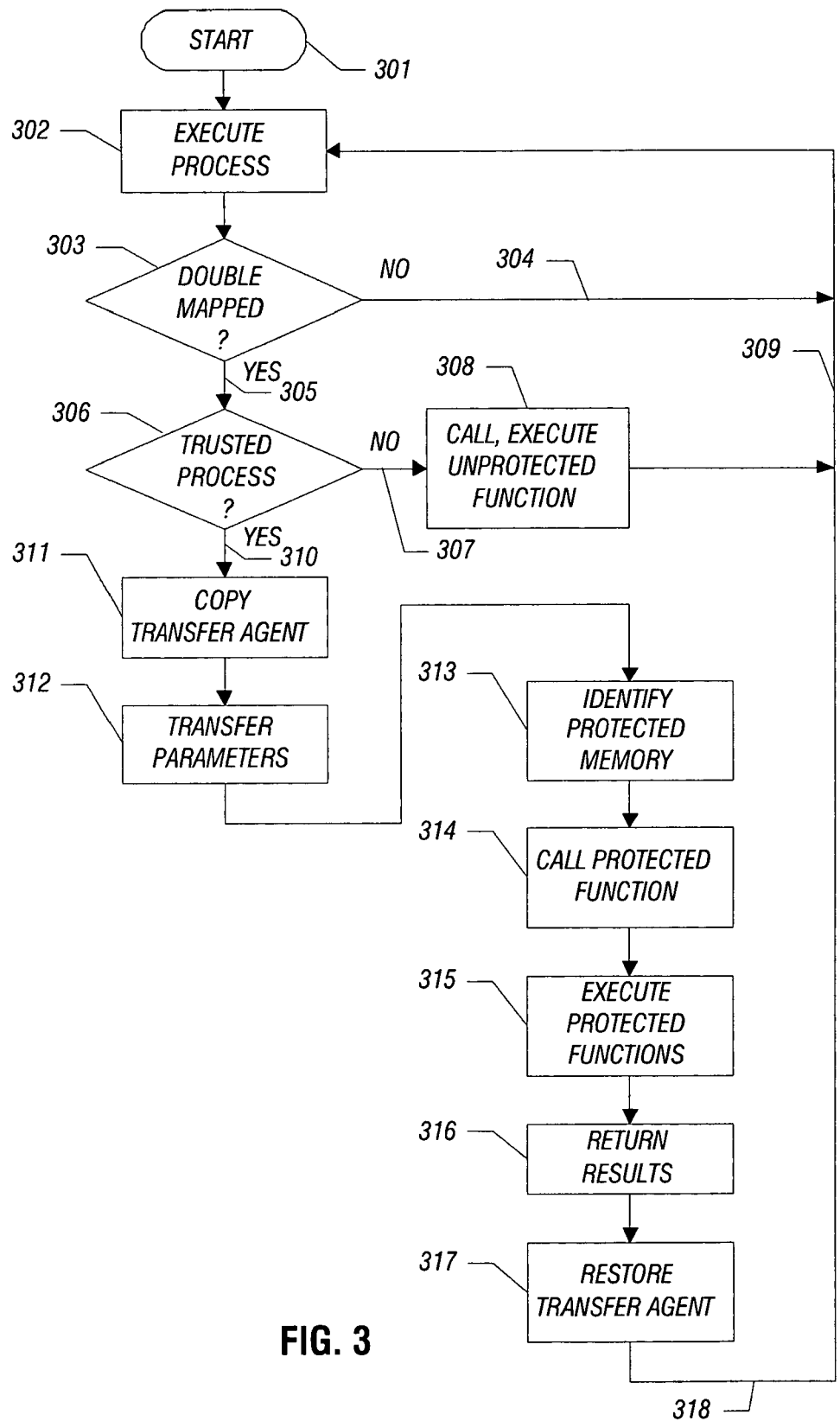
FIG. 3 is a flow diagram of a method, in one embodiment of invention, to control a process that includes multiple-mapped memory.

FIG. 3 is a flow chart that depicts the manner in which multiple-mapped memory may be controlled and managed in accordance with an embodiment of the present invention. It must be understood here that the method flow and sequence illustrated graphically in FIG. 3 is intended to be exemplary, rather than definitive, with respect to the invention. For example, methods that exclude, or include certain additional, steps may nonetheless be captured by the scope of the subject invention. In addition, the sequence of steps may depart from that which is illustrated in FIG. 3.

Execution of the target process commences at 301. The target process continues to execute at 302. Throughout execution of the process, attention is paid to the occurrence of multiple-mapped memory. This activity is represented at decision block 303. In this context it may be assumed that in one embodiment of the invention, the trust co-processor and the trusted process are mutually familiar, at least in the sense that the trust co-processor "knows" that the process incorporates multiple-mapped memory, as does the trusted process. Alternatively, transfer agent 130 (see description below) may be also aware, or be made aware of, the existence of double-mapped memory.

If the then-encountered memory is not multiple-mapped memory, the process step at hand is executed. Subsequently, branch 304 is taken, and process execution returns to 302.

However, if at 303 a determination is made that multiple-mapped memory has been encountered, then branch 305 is taken. At 306 a determination is made whether the process is a trusted process vel non. As indicated herein above, this determination is made by the trust co-processor, and irrespective of the sequence explicitly illustrated in FIG. 3, it is to be understood that this determination may be made at various points in time. For example, the trust co-processor may have made this determine in advance of the particular occasion on which the process is to be executed. (Recall that if the process is a trusted process signal 210 will equal T, otherwise, T̄.) If a determination is made that the process is not a trusted process, then branch 307 is taken. In this situation, at 308 unprotected functionality resident at unprotected memory 108 is called and executed. Subsequent to the execution of the unprotected function, at branch 309 the process returns to 302. Alternatively, if the process is determined to be a trusted process (signal 210=T), then branch 310 is taken.

At this point it is appropriate to introduce a salient component that inheres in at least one embodiment of the invention. As may be seen in FIG. 1, a system in which the invention is implemented may include a transfer agent 130 that may be stored, for example, in nonvolatile memory, such as ROM 103. In a manner that will be more fully explained below, transfer agent 130 comprises programmed instructions that, when executed perform functions that are ancillary to the execution of a protected function. Transfer agent executes on those occasions when the multiple-mapped memory 121 is selectively mapped to the protected memory space mapped. In a preferred embodiment, transfer agent 130 may be permanently stored in ROM in order to maintain the integrity of operation. Upon execution, the transfer agent may be copied to and executed from SRAM 120. When executing transfer agent 130 manages, at least temporarily, execution of the process.

At 311, the transfer agent is copied from its permanent location to the memory space in which the process is executing, e.g., SRAM 120. Recall from above that, in one embodiment of the invention, the transfer agent is stored in nonvolatile ROM 103. Such storage is calculated to assure the integrity of the transfer agent and its insusceptibility to tampering or unauthorized access, contamination, or modification.

At 312, operation of the transfer agent is enabled by writing to the transfer agent parameters necessary for the transfer agent to identify, call, and execute the protected function in memory 107. In one embodiment, the relevant parameters are written to the transfer agent from the then-executing process, but the invention contemplates all techniques that may be devised to enable operation of the transfer agent.

At 313, 314 and 315, the protected function is, respectively, identified, called, and executed, under control, supervision and management of the transfer agent.

At 316, results (if any) of the execution of the protected function are delivered to the process. At 317, operation of the transfer agent in internal SRAM is terminated, and the transfer agent is returned to permanent storage. (Of course, had the transfer agent been copied from ROM to SRAM, then the transfer agent may need only to be deleted from the memory space it occupied in SRAM while executing.) At 318, execution of the process returns on branch 309 to 302.

An advisory note is likely warranted here. For purposes of simplicity, the arrangement and operation of the invention has been based on a configuration in which the multiple-mapped memory 121 is stored and executes on internal memory 102, and is mapped to, alternatively, protected internal memory 107 or to unprotected external memory 108. In some circumstances, the above configuration may represent a preferred implementation. However, understand that the invention is not constrained in this manner. That is, the multiple-mapped memory may execute from, or be stored in, either internal or external memory, and may be mapped to either internal or external memory.

Accordingly, from the above description, the subject invention may be appreciated as representing a salutary approach to the management of multiple-mapped memory. In particular, in one embodiment, the invention enables selectable execution of a protected function that may be stored in protected memory.

Although the description makes reference to specific components of a generalized processor-based system, such as system 10, it is contemplated that numerous modifications and variations of the described and illustrated embodiments may be possible. Moreover, while FIG. 1 shows a block diagram of a generalized processor-based system, it is to be understood that embodiments of the present invention may be implemented in a wireless device such as a cellular phone, personal digital assistant (PDA) or the like.

In such embodiments, the invention may be coupled to an analog front end (AFE) that constitutes part of a cellular telephone system. One embodiment of such an AFE is depicted as wireless interface 140 in FIG. 1. As may be seen there, a cellular, or other, wireless system includes an antenna 150 that is coupled to interface 140. Interface 140, in turn, may comprise in one embodiment, a diplexer that couples an RF (radio frequency) transceiver to antenna 150. Specifically in the transmit mode of operation, the diplexer couples the transmitter section of the RF transceiver to antenna 150. In the receive mode, the diplexer couples the receiver section of the RF transceiver to antenna 150. The RF transceiver may also be coupled to an analog mixed signal section.

In addition, skilled practitioners recognize that embodiments may also be realized in software (or in the combination of software and hardware) that may be executed on a host system, such as, for example, a computer system, a wireless device, or the like. Accordingly, such embodiments may comprise an article in the form of a machine-readable storage medium onto which there are written instructions, data, etc. that constitute a software program that defines at least an aspect of the operation of the system. The storage medium may include, but is not limited to, any type of disk, including floppy disks, optical disks, compact disk read-only memories (CD-ROMs), compact disk rewritables (CD-RWs), and magneto-optical disks, and may include semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a process is to utilize multiple-mapped memory;
a first set of memory mapped onto the multiple-mapped memory;
a second set of memory mapped onto the multiple-mapped memory; and
an address overload circuit to selectively map the multiple-mapped memory to the first set of memory or to the second set of memory, the address overload circuit comprising an address multiplexer to receive a first address and a second address from an address translator coupled to the address multiplexer, and a data multiplexer coupled to the first set of memory and the second set of memory to output information from the first set of memory or the second set of memory; a trust coprocessor to determine if the process is trusted, wherein the address overload circuit to be controlled by a control signal from the trust coprocessor.

2. A system as defined in claim 1, wherein the second set of memory comprises instructions to execute a protected function.

3. A system as defined in claim 1, further comprising a transfer agent to receive parameters from the process and to assume control of execution of the process when the multiple-mapped memory is mapped to a protected set of memory.

4. A system as defined in claim 3, wherein the transfer agent is to call a protected function.

5. A system as defined in claim 4, wherein the transfer agent is to call the protected function using parameters received from the process.

6. A system as defined in claim 4, wherein the transfer agent is stored on nonvolatile memory.

7. A system as defined in claim 6, wherein the transfer agent is to execute on internal memory.

8. A method comprising:
executing a process that is to utilize multiple-mapped memory;
determining whether the process is a trusted process;
if the process is determined not to be a trusted process, mapping the multiple-mapped memory to unprotected memory; and
if the process is determined to be a trusted process, mapping the multiple-mapped memory to protected memory, copying a transfer agent to a second memory, transferring parameters from the process to the transfer agent, and controlling execution of the process with the transfer agent.

9. A method as defined in claim 8, wherein the transfer agent is stored in a first memory.

10. A method as defined in claim 8, further comprising:
executing the transfer agent so as to identity a protected function and to call the protected function.

11. A method as defined in claim 10, further comprising:
executing the protected function.

12. A method as defined in claim 8, further comprising:
operating a trust co-processor to determine whether the process is a trusted process.

13. A method as defined in claim 12, further comprising:
executing the transfer agent so as to identify a protected function and to call the protected function.

14. A method as defined in claim 13, further comprising:
executing the protected function.

15. An article comprising a machine-readable storage medium on which there are stored instructions that, if executed, enable a system to:
determine whether a process is a trusted process;
if the process is a trusted process, transfer, at least temporarily, control of the process to a transfer agent and transfer process parameters to the transfer agent;
identify and execute a protected function; and
copy the transfer agent from nonvolatile memory to volatile memory in the course of executing multiple-mapped memory.

16. An article as defined in claim 15, wherein the instructions, if executed, enable the system to determine whether the process is a trusted process in response to the detection of the multiple-mapped memory.

17. An article as defined in claim 15, wherein the instructions, if executed, enable the system to:
by operation of the transfer agent, identify, call, and execute the trusted process.

18. A system comprising:
an integrated circuit device comprising a processor, internal random access memory (RAM), and internal read only memory (ROM);
unprotected memory;
protected memory;

a process to execute on the internal RAM, the process that utilizes multiple-mapped memory, the multiple-mapped memory to be mapped to either the protected memory or the unprotected memory;

a trust co-processor to determine whether the multiple-mapped memory is to be mapped to the unprotected memory or to the protected memory;

a circuit coupled to the trust co-processor to map the multiple-mapped memory to the protected memory, the circuit comprising an address multiplexer, an address translator coupled to the address multiplexer, and a data multiplexer, wherein the address multiplexer and the data multiplexer are to be controlled based on an output of the trust co-processor;

a wireless interface coupled to the processor; and an antenna coupled to the wireless interface.

19. A system as defined in claim 18, further comprising a transfer agent to receive parameters from a trusted process, call a protected function using the parameters, and cause the protected function to execute.

20. The system of claim 18, further comprising a memory controller including the circuit.

21. An apparatus comprising:

an address selector to receive an address and a translated address, the address selector to provide an output mapped to a respective one of a protected storage and an unprotected storage, the address selector to map the output to the protected storage if a process is trusted;

a data selector to receive data from the protected storage and the unprotected storage; and a trust coprocessor to determine if the process is trusted, wherein the address selector and the data selector are to be controlled by a control signal from the trust coprocessor.

22. The apparatus of claim 21, further comprising an address translator coupled to the address selector to generate the translated address.

23. The apparatus of claim 22, wherein the address translator is coupled to receive the address.

24. The apparatus of claim 21, wherein the apparatus comprises a memory controller coupled between a processor and the protected storage.

* * * * *